Feb. 10, 1925.
H. SANNER
1,526,015
CONTROL RESISTANCE BELLOWS
Filed Nov. 21, 1923
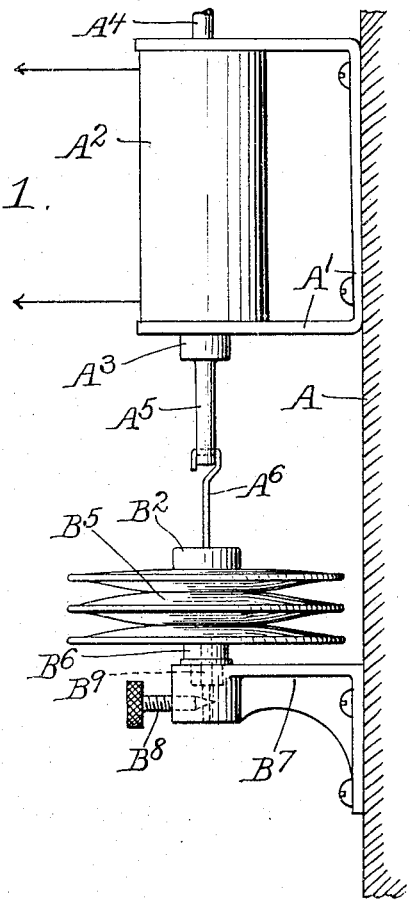
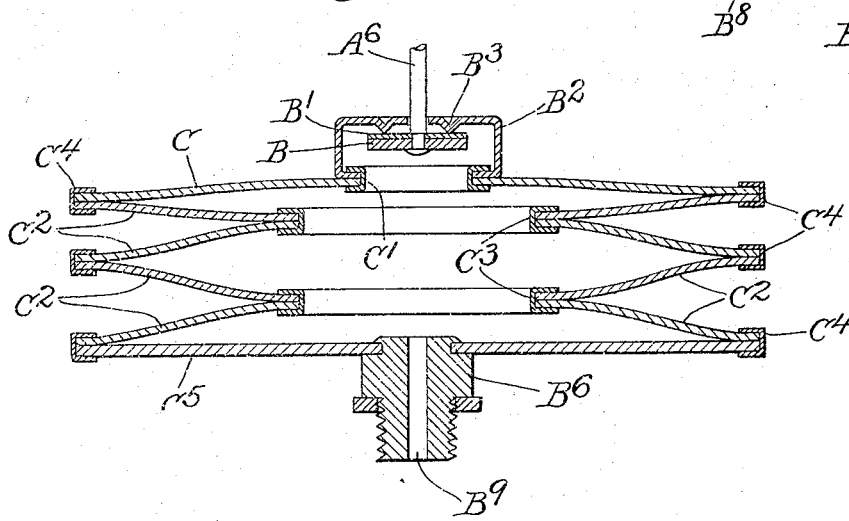
Inventor:
Hulbert Sanner.
by Parker & Carter
Attorneys.

Patented Feb. 10, 1925.

1,526,015

UNITED STATES PATENT OFFICE.

HULBERT SANNER, OF CHICAGO, ILLINOIS, ASSIGNOR TO LOTHAR EDERER, OF CHICAGO, ILLINOIS.

CONTROL RESISTANCE BELLOWS.

Application filed November 21, 1923. Serial No. 676,206.

*To all whom it may concern:*

Be it known that I, HULBERT SANNER, a citizen of the United States, residing at Chicago, in the county of Cook and State of Illinois, have invented a certain new and useful Improvement in Control Resistance Bellows, of which the following is a specification.

My invention relates to improvements in control resistance bellows and has for one object to provide a new and improved form of resistance or dash pot mechanism for use in connection with delayed action machinery of all kinds and particularly for use in connection with electrical switches and the like as a substitute for dash pots. One object of my invention is to provide such a device which will be more sensitive and responsive in action than is the normal dash pot. Other objects will appear from time to time in the specification and claims.

My invention is illustrated more or less diagrammatically in the accompanying drawings wherein:

Figure 1 shows a side elevation of my device in connection with a solenoid plunger;

Figure 2 shows a section on an enlarged scale through the bellows.

Like parts are designated by like characters throughout.

A indicates a support or switch board projecting from which is a U-shaped bracket $A^1$ which carries an electrically excited solenoid coil $A^2$. $A^3$ is a solenoid plunger which carries a working rod $A^4$ which may lead to a switch, not here shown. Projecting downwardly from the plunger $A^3$ is a control rod $A^5$ carrying loosely mounted thereon a hooked valve rod $A^6$.

This valve rod $A^6$ terminates in a valve head B having a facing of felt or rubber or other suitable material as at $B^1$. $B^2$ is a valve cup centrally apertured to permit the passing of the valve stem $A^6$, and provided with an inwardly projecting annular ring $B^3$ in opposition to the packing $B^1$ so that when the ring $B^3$ is held against the packing $B^1$, as for instance by an upward movement of the solenoid plunger $A^3$, and hook $A^6$, the entrance of air into the valve housing along the valve stem $A^6$ is prevented. Movement of the solenoid plunger downward, of course, frees the ring $B^3$ from engagement with the packing $B^1$; and permits air to enter into the valve housing and thence into the bellows. $B^5$ indicates generally the bellows arrangement mounted on the adjustable valve stem $B^6$, which stem is supported on a bracket $B^7$ on the panel A. $B^8$ is a needle valve having a screw shank and thumb nut by which the flow of the air in through the passage $B^9$ may be regulated by setting the needle valve at any desired point. The upward movement of the solenoid plunger $A^3$ may be accurately controlled because the smaller the opening through which the air may penetrate past the valve $B^8$, the slower will be the upward movement of the valve stem $A^6$. As air is drawn into the bellows the downward movement, of course, depends not on the valve $B^8$ but on the valve B and is much more rapid.

The bellows itself comprises end annular disk C of flexible or impervious material, preferably rubberized cloth This disk is centrally apertured in line with the valve housing $B^2$. It is held in connection therewith by a washer $C^1$ which is upset to grip the annular flange on the valve housing and the inner periphery of the washer or disk C. $C^2$ $C^2$ are bellows rings of the same outer diameter as the disk C but of larger inner diameter. These rings are held together at their inner and outer peripheries by means of compression washers $C^3$ and $C^4$ which are upset to grip their edges to make an air tight joint. The upper one of the group is held on the disk C by similar washer $C^4$ and the lower one is attached to a disk $C^5$ by a similar washer. This disk $C^5$ is mounted on the valve stem $B^6$ and it may be of flexible material as are the other disks, or of metal or of any other suitable material.

In operation when the solenoid is excited it pulls up on the solenoid plunger. This immediately seats the valve B and pulls up on the bellows creating a vacuum therein. There is a slight initial movement until the bellows walls and disks are under tension when that movement ceases or slows down, it being limited only by the speed which the air may enter the lower control valve as the solenoid plunger continues its pull. The time of travel of the solenoid plunger can be very accurately set and controlled by adjusting the needle valve and the only thing that controls this time is the rate of inflow of air. There is no appreciable friction and no account need be taken of the resistance of an oil film, or temperature, or moisture changes so that the only adjustment of the rate of movement is made by manipulation of the needle valve.

It will be evident that I have shown in my drawings an operative device, still many changes might be made in size, shape and arrangement, without departing materially from the spirit of my invention; and I wish, therefore, to have my drawings be regarded as in a sense diagrammatic.

I claim:

1. A bellows comprising a plurality of superposed flexible annular disks, and relatively rigid washers crimped about their opposed inner and outer peripheries to form air tight joints between the adjacent disks.

2. The combination with a solenoid coil and plunger actuated thereby, of a bellows, one element of which is connected to the plunger, the other element of which is rigidly mounted, and an adjustable valve adapted to permit gradual air flow, responsive to the expanding movement of the bellows resulting from the solenoid operation.

3. The combination with a solenoid coil and plunger actuated thereby, of a bellows, one element of which is connected to the plunger, the other element of which is rigidly mounted, and an adjustable valve adapted to permit gradual air flow, responsive to the expanding movement of the bellows resulting from the solenoid operation, and means for permitting rapid air flow when the plunger is moved in an opposite direction to collapse the bellows.

4. A combination with a solenoid coil and plunger of a bellows connected thereto, a valve forming a part of said connection adapted to close completely when the plunger moves in one direction, and to open for free air flow when the plunger moves in the opposite direction.

5. A combination with a solenoid coil and plunger of a bellows connected thereto, a valve forming a part of said connection adapted to close completely when the plunger moves in one direction, and to open for free air flow when the plunger moves in the opposite direction, and a control valve adapted to permit gradual air flow.

6. A bellows comprising a hollow valve stem, an adjustable needle valve adapted to control air passing therethrough, an annular plate mounted thereon, a plurality of superposed flexible annular disks joined at their alternate inner and outer peripheries, one of the disks being joined at its outer periphery to the outer periphery of the annular plate, and a closure for the opposed end of the bellows.

7. A bellows comprising a hollow valve stem, an adjustable needle valve adapted to control air passing therethrough, an annular plate mounted thereon, a plurality of superposed flexible annular disks joined at their alternate inner and outer peripheries, one of the disks being joined at its outer periphery to the outer periphery of the annular plate, and a closure for the opposed end of the bellows, a separate valve associated with the bellows adapted to seat and close when the bellows move in one direction and to open wide for the free passage of air when the bellows move in an opposite direction.

8. A bellows comprising a hollow valve stem, an adjustable needle valve adapted to control air passing therethrough, an annular plate mounted thereon, a plurality of superposed flexible annular disks joined at their alternate inner and outer peripheries, one of the disks being joined to the annular plate, and a closure for the opposed end of the bellows, a separate valve associated with the bellows adapted to seat and close when the bellows move in one direction and to open wide for the free passage of air when the bellows move in an opposite direction, said valve comprising a housing associated with the closure, a valve plate contained therein, a valve stem passing through the wall of the housing and carrying the valve plate and an annular valve ring projecting inwardly from the housing wall adapted to be engaged by the valve plate.

9. A bellows comprising a hollow valve stem, an adjustable needle valve adapted to control air passing therethrough, an annular plate mounted thereon, a plurality of superposed flexible annular disks joined at their alternate inner and outer peripheries, one of the disks being joined at its outer periphery to the outer periphery of the annular plate, and a closure for the opposed end of the bellows, a separate valve associated with the bellows adapted to seat and close while the bellows are expanding and open wide for free passage of air while the bellows are collapsing.

Signed at Chicago, county of Cook and State of Illinois, this 16th day of November, 1923.

HULBERT SANNER.